United States Patent
Schrooten et al.

(10) Patent No.: US 9,472,817 B2
(45) Date of Patent: Oct. 18, 2016

(54) ELECTROCHEMICAL CELL AND MEMBRANES RELATED THERETO

(75) Inventors: Jeremy Schrooten, Mission (CA); Gerard F. McLean, West Vancouver (CA); Paul Sobejko, North Vancouver (CA)

(73) Assignee: Intelligent Energy Limited, Loughborough (GB)

( * ) Notice: Subject to any disclaimer, the term of this patent is extended or adjusted under 35 U.S.C. 154(b) by 865 days.

(21) Appl. No.: 12/920,064

(22) PCT Filed: Feb. 27, 2009

(86) PCT No.: PCT/CA2009/000253
§ 371 (c)(1),
(2), (4) Date: Aug. 27, 2010

(87) PCT Pub. No.: WO2009/105896
PCT Pub. Date: Sep. 3, 2009

(65) Prior Publication Data
US 2011/0003229 A1    Jan. 6, 2011

Related U.S. Application Data

(60) Provisional application No. 61/032,909, filed on Feb. 29, 2008.

(51) Int. Cl.
*H01M 8/02* (2016.01)
*H01B 1/12* (2006.01)
(Continued)

(52) U.S. Cl.
CPC ........... *H01M 8/0291* (2013.01); *H01B 1/122* (2013.01); *H01M 8/1004* (2013.01);
(Continued)

(58) Field of Classification Search
CPC ........... H01M 8/1023; H01M 8/1051; H01M 8/1065; H01M 8/1039; H01M 8/0271; H01M 8/0291; H01M 8/1053; H01M 8/241; H01M 8/2465; H01M 8/1067; H01M 8/10; H01M 8/1004; H01B 1/122; Y02E 60/521
USPC ......................................... 429/457, 518, 535
See application file for complete search history.

(56) References Cited

U.S. PATENT DOCUMENTS 3,402,230 A    9/1968   White, Jr.
5,160,627 A    11/1992  Cussler et al.
(Continued)

FOREIGN PATENT DOCUMENTS

CA    2408587 A1    12/2001
CA    2408588 A1    12/2001
(Continued)

OTHER PUBLICATIONS

"U.S. Appl. No. 12/238,241, Final Office Action mailed Apr. 10, 2012", 14 pgs.
"U.S. Appl. No. 12/238,241, Response filed Feb. 24, 2012 to Non Final Office Action mailed Nov. 25, 2011", 14 pgs.
(Continued)

*Primary Examiner* — Jonathan Jelsma
*Assistant Examiner* — Omar Kekia
(74) *Attorney, Agent, or Firm* — Baker & Hostetler LLP

(57) ABSTRACT

Embodiments of the invention relate to electrochemical cells and membranes including alternating electrically conductive and dielectric regions. One embodiment describes an ion-conducting composite layer for an electrochemical cell, including two or more electrically conductive components, each electrically conductive component having one or more electrically conductive passageways and one or more dielectric components, each dielectric component having one or more ion-conducting passageways. The electrically conductive components and the dielectric components are adjacently arranged to provide a fluidically impermeable composite layer.

33 Claims, 6 Drawing Sheets

(51) Int. Cl.
*H01M 8/10* (2016.01)
*H01M 8/24* (2016.01)

(52) U.S. Cl.
CPC ....... *H01M 8/1023* (2013.01); *H01M 8/1039* (2013.01); *H01M 8/1051* (2013.01); *H01M 8/1053* (2013.01); *H01M 8/1065* (2013.01); *H01M 8/1067* (2013.01); *H01M 8/241* (2013.01); H01M 8/0271 (2013.01); H01M 8/2465 (2013.01); Y02E 60/521 (2013.01)

(56) References Cited

U.S. PATENT DOCUMENTS

| | | |
|---|---|---|
| 5,171,646 A | 12/1992 | Rohr |
| 5,190,834 A | 3/1993 | Kendall |
| 5,310,765 A | 5/1994 | Banerjee et al. |
| 5,364,711 A | 11/1994 | Yamada et al. |
| 5,432,023 A | 7/1995 | Yamada et al. |
| 5,468,574 A | 11/1995 | Ehrenberg et al. |
| 5,547,551 A | 8/1996 | Bahar et al. |
| 5,587,253 A | 12/1996 | Gozdz et al. |
| 5,599,614 A | 2/1997 | Bahar et al. |
| 5,635,041 A | 6/1997 | Bahar et al. |
| 5,679,482 A | 10/1997 | Ehrenberg et al. |
| 5,709,961 A | 1/1998 | Cisar et al. |
| 5,783,324 A | 7/1998 | Binder et al. |
| 5,853,916 A | 12/1998 | Venugopal et al. |
| 5,861,221 A | 1/1999 | Ledjeff et al. |
| 5,863,672 A | 1/1999 | Ledjeff et al. |
| 5,925,477 A | 7/1999 | Ledjeff et al. |
| 5,952,118 A | 9/1999 | Ledjeff et al. |
| 5,989,741 A | 11/1999 | Bloomfield et al. |
| 6,127,058 A | 10/2000 | Pratt et al. |
| 6,131,851 A | 10/2000 | Williams |
| 6,387,559 B1 | 5/2002 | Koripella et al. |
| 6,544,400 B2 | 4/2003 | Hockaday et al. |
| 6,551,745 B2 | 4/2003 | Moutsios et al. |
| 6,579,643 B1 | 6/2003 | Gozdz |
| 6,582,847 B1 | 6/2003 | Bruck et al. |
| 6,613,203 B1 | 9/2003 | Hobson et al. |
| 6,641,862 B1 | 11/2003 | Grot |
| 6,680,139 B2 | 1/2004 | Narayanan et al. |
| 6,815,121 B2 | 11/2004 | Dasgupta et al. |
| 6,933,077 B2 | 8/2005 | Sudano et al. |
| 7,078,361 B2 | 7/2006 | Cisar et al. |
| 7,118,826 B2 | 10/2006 | O'Neil et al. |
| 7,153,601 B2 | 12/2006 | Mardilovich et al. |
| 7,223,491 B2 | 5/2007 | McLean et al. |
| 7,226,646 B2 | 6/2007 | McLean et al. |
| 7,229,564 B2 | 6/2007 | Liu et al. |
| 7,314,677 B2 | 1/2008 | Mosdale |
| 7,323,266 B2 | 1/2008 | Morishima et al. |
| 7,341,800 B2 | 3/2008 | Sasahara et al. |
| 7,378,176 B2 | 5/2008 | McLean et al. |
| 7,410,720 B2 | 8/2008 | Yoshitake et al. |
| 7,604,887 B2 | 10/2009 | Mino et al. |
| 7,632,587 B2 | 12/2009 | Mclean et al. |
| RE41,163 E | 3/2010 | Ngo et al. |
| 7,858,261 B2 | 12/2010 | Schaevitz et al. |
| 7,858,262 B2 | 12/2010 | Faucheux et al. |
| 8,173,326 B2 | 5/2012 | Lundblad et al. |
| 8,232,025 B2 * | 7/2012 | McLean et al. ............. 429/517 |
| 8,551,637 B2 | 10/2013 | Francis et al. |
| 8,628,890 B2 | 1/2014 | McLean et al. |
| 8,790,842 B2 | 7/2014 | Schrooten et al. |
| 2003/0049516 A1 | 3/2003 | Twu et al. |
| 2003/0077496 A1 | 4/2003 | Keegan et al. |
| 2003/0082425 A1 | 5/2003 | Leban |
| 2003/0104273 A1 | 6/2003 | Lee et al. |
| 2003/0152817 A1 | 8/2003 | Sato et al. |
| 2003/0162076 A1 | 8/2003 | Kubota |
| 2003/0175569 A1 | 9/2003 | Inagaki et al. |
| 2003/0194598 A1 | 10/2003 | Chan |
| 2003/0215719 A1 | 11/2003 | Navarrini et al. |
| 2004/0053100 A1 | 3/2004 | Stanley et al. |
| 2004/0062965 A1 | 4/2004 | Morse et al. |
| 2004/0071865 A1 | 4/2004 | Mosdale et al. |
| 2004/0081878 A1 | 4/2004 | Mardilovich et al. |
| 2004/0175626 A1 | 9/2004 | Dasgupta et al. |
| 2004/0209136 A1 | 10/2004 | Ren et al. |
| 2004/0224190 A1 | 11/2004 | Sasahara et al. |
| 2005/0249994 A1 | 11/2005 | McLean et al. |
| 2005/0250004 A1 | 11/2005 | McLean et al. |
| 2005/0260478 A1 | 11/2005 | Mino et al. |
| 2006/0127734 A1 | 6/2006 | McLean et al. |
| 2007/0090786 A1 | 4/2007 | McLean |
| 2007/0134531 A1 | 6/2007 | Kimura et al. |
| 2007/0166590 A1 | 7/2007 | Nakano et al. |
| 2007/0184330 A1 | 8/2007 | McLean et al. |
| 2007/0224488 A1* | 9/2007 | Yen et al. ............. 429/42 |
| 2008/0220210 A1 | 9/2008 | McLean et al. |
| 2008/0233446 A1 | 9/2008 | Zimmermann et al. |
| 2008/0233454 A1 | 9/2008 | Capron et al. |
| 2008/0248352 A1 | 10/2008 | McLean et al. |
| 2009/0081493 A1 | 3/2009 | Schrooten et al. |
| 2010/0035110 A1 | 2/2010 | Lundblad |
| 2010/0159349 A1 | 6/2010 | Highgate et al. |
| 2010/0183955 A1* | 7/2010 | McLean et al. ............. 429/517 |
| 2011/0274959 A1 | 11/2011 | Bailey et al. |
| 2012/0270132 A1 | 10/2012 | McLean et al. |
| 2014/0127601 A1 | 5/2014 | McLean et al. |
| 2014/0308598 A1 | 10/2014 | Schrooten et al. |

FOREIGN PATENT DOCUMENTS

| | | |
|---|---|---|
| CA | 2408538 A1 | 11/2002 |
| CA | 2473491 A1 | 8/2003 |
| CA | 2479000 A1 | 9/2003 |
| CA | 2446121 A1 | 4/2004 |
| CN | 1461070 A1 | 12/2003 |
| CN | 101981734 B | 11/2013 |
| EP | 0763070 A1 | 3/1997 |
| EP | 0763070 B1 | 3/1997 |
| EP | 1202365 A1 | 5/2002 |
| EP | 1294039 A1 | 3/2003 |
| EP | 1345280 A1 | 9/2003 |
| GB | 1091303 A | 11/1967 |
| JP | 10510390 A | 10/1998 |
| JP | 2001-514431 A | 9/2001 |
| JP | 2003-123792 A | 4/2003 |
| JP | 2004-504700 A | 2/2004 |
| JP | 2004517446 A | 6/2004 |
| JP | 2004523063 A | 7/2004 |
| JP | 2005-190752 A | 7/2005 |
| JP | 2006-127852 A | 5/2006 |
| JP | 2006522446 A | 9/2006 |
| JP | 2007536713 A | 12/2007 |
| JP | 2008-041371 A | 2/2008 |
| JP | 2008108465 A | 5/2008 |
| JP | 2008544473 A | 12/2008 |
| JP | 2009505363 A | 2/2009 |
| KR | 20100137489 A | 12/2010 |
| WO | WO-95/32236 A1 | 11/1995 |
| WO | WO-97/41168 A1 | 11/1997 |
| WO | WO-99/10165 A1 | 3/1999 |
| WO | WO-99/67447 A1 | 12/1999 |
| WO | WO-01/74710 A1 | 10/2001 |
| WO | WO-2004/019439 A1 | 3/2004 |
| WO | WO-2005106078 A1 | 11/2005 |
| WO | WO-2007/00593 A2 | 1/2007 |
| WO | WO-2007/020242 A1 | 2/2007 |
| WO | WO-2007/079580 A1 | 7/2007 |
| WO | WO-2007110956 A1 | 10/2007 |
| WO | WO-2009/039656 A1 | 4/2009 |
| WO | WO-2009/105896 A1 | 9/2009 |

OTHER PUBLICATIONS

"U.S. Appl. No. 12/637,422, Notice of Allowance mailed Jan. 24, 2012", 9 pgs.

"U.S. Appl. No. 12/637,422, Notice of Allowance mailed Apr. 2, 2012", 9 pgs.

(56) References Cited

OTHER PUBLICATIONS

"European Application Serial No. 05741083.9, Response filed Dec. 15, 2011 to Office Action mailed Aug. 12, 2011", 18 pgs.
"European Application Serial No. 11001213.5, Partial European Search Report mailed Jan. 30, 2012", 8 pgs.
"Machine Translation of JP 2003-123792A, dated Apr. 25, 2003", 21 pgs.
"U.S. Appl. No. 11/047,558, Final Office Action mailed Jun. 16, 2006", 15 pgs.
"U.S. Appl. No. 11/047,558, Interview Summary dated Oct. 17, 2006", 2 pgs.
"U.S. Appl. No. 11/047,558, Non-Final Office Action mailed Jan. 22, 2007", 6 pgs.
"U.S. Appl. No. 11/047,558, Non-Final Office Action mailed Nov. 28, 2005", 14 pgs.
"U.S. Appl. No. 11/047,558, Notice of Allowance mailed Jan. 24, 2008", 4 pgs.
"U.S. Appl. No. 11/047,558, Notice of Allowance mailed Oct. 3, 2007", 3 pgs.
"U.S. Appl. No. 11/047,558, Notice of Non-Compliant Amendment mailed Jun. 28, 2007", 2 pgs.
"U.S. Appl. No. 11/047,558, Response filed Mar. 28, 2006 to Non-Final Office Action mailed Nov. 28, 2005", 12 pgs.
"U.S. Appl. No. 11/047,558, Response filed Apr. 20, 2007 to Non-Final Office Action mailed Jan. 22, 2007", 11 pgs.
"U.S. Appl. No. 11/047,558, Response filed Jul. 27, 2007 to Non-Final Office Action mailed Jan. 22, 2007", 11 pgs.
"U.S. Appl. No. 11/047,558, Response filed Sep. 20, 2005 to Restriction Requirement mailed Aug. 23, 2005", 1 pg.
"U.S. Appl. No. 11/047,558, Response filed Nov. 15, 2006 to Final Office Action mailed Jun. 16, 2006", 14 pgs.
"U.S. Appl. No. 11/047,558, Restriction Requirement mailed Aug. 23, 2005", 6 pgs.
"U.S. Appl. No. 11/047,560, Non-Final Office Action mailed Dec. 24, 2008", 12 pgs.
"U.S. Appl. No. 11/047,560, Amendment and Response filed Mar. 2, 2007 to Non-Final Office Action mailed Nov. 2, 2006", 15 pgs.
"U.S. Appl. No. 11/047,560, Internview Summary mailed Feb. 23, 2007", 2 pgs.
"U.S. Appl. No. 11/047,560, Internview Summary mailed Oct. 17, 2006", 2 pgs.
"U.S. Appl. No. 11/047,560, Non-Final Office Action mailed May 3, 2006", 12 pgs.
"U.S. Appl. No. 11/047,560, Non-Final Office Action mailed Jun. 15, 2007", 12 pgs.
"U.S. Appl. No. 11/047,560, Non-Final Office Action mailed Nov. 2, 2006", 15 pgs.
"U.S. Appl. No. 11/047,560, Notice of Allowance mailed Jul. 28, 2009", 4 pgs.
"U.S. Appl. No. 11/047,560, Notice of Allowance mailed Sep. 26, 2008", 4 pgs.
"U.S. Appl. No. 11/047,560, Response filed Feb. 8, 2006 to Restriction Requirement mailed Jan. 9, 2006", 2 pgs.
"U.S. Appl. No. 11/047,560, Response filed Mar. 24, 2009 to Non Final Office Action mailed Dec. 24, 2008", 11 pgs.
"U.S. Appl. No. 11/047,560, Response filed Aug. 3, 2006 to Non-Final Office Action mailed May 3, 2006", 15 pgs.
"U.S. Appl. No. 11/047,560, Response filed Sep. 17, 2007 to Non-Final Action mailed Jun. 15, 2007", 6 pgs.
"U.S. Appl. No. 11/047,560, Response filed Nov. 8, 2005 to Restriction Requirement mailed Aug. 23, 2005", 2 pgs.
"U.S. Appl. No. 11/047,560, Restriction Requirement mailed Jan. 9, 2006", 5 pgs.
"U.S. Appl. No. 11/047,560, Restriction Requirement mailed Aug. 23, 2005", 5 pgs.
"U.S. Appl. No. 11/290,646, Non-Final Office Action mailed Jun. 15, 2006", 13 pgs.
"U.S. Appl. No. 11/290,646, Notice of Allowance mailed Feb. 22, 2007", 4 pgs.
"U.S. Appl. No. 11/290,646, Response filed Nov. 15, 2006 to Non-Final Office Action mailed Jun. 16, 2006", 8 pgs.
"U.S. Appl. No. 11/290,647, Non-Final Office mailed Jun. 15, 2006", 9 pgs.
"U.S. Appl. No. 11/290,647, Notice of Allowance Jan. 26, 2007", 4 pgs.
"U.S. Appl. No. 11/290,647, Response filed Nov. 15, 2006 to Non-Final Office mailed Jun. 15, 2006", 9 pgs.
"U.S. Appl. No. 12/126,811, Final Office Action mailed Aug. 3, 2011", 14 pgs.
"U.S. Appl. No. 12/126,811, Non Final Office Action mailed Dec. 23, 2010", 15 pgs.
"U.S. Appl. No. 12/126,811, Response filed May 16, 2011 to Non Final Office Action mailed Dec. 23, 2010", 13 pgs.
"U.S. Appl. No. 12/238,241, Response filed Aug. 19, 2011 to Restriction Requirement mailed Jul. 19, 2011", 6 pgs.
"U.S. Appl. No. 12/238,241, Restriction Requirement mailed Jul. 19, 2011", 6 pgs.
"U.S. Appl. No. 12/637,422, Non Final Office Action mailed Feb. 2, 2011", 9 pgs.
"U.S. Appl. No. 12/637,422, Response filed Aug. 2, 2011 to Non Final Office Action mailed Feb. 2, 2011", 12 pgs.
"Chinese Application Serial No. 200580018092.5, Response filed Apr. 15, 2009 to Office Action mailed Feb. 6, 2009", 8 pgs.
"Chinese Application Serial No. 200580018092.5, Response filed Nov. 4, 2009 to Third Office Action dated Jun. 19, 2009", (w/ English Translation of Amended Claims), 14 pgs.
"Chinese Application Serial No. 200580018092.5, Fourth Office Action mailed Dec. 4, 2009", (w/ English Translation), 21 pgs.
"Chinese Application Serial No. 200580018092.5, Response filed Apr. 14, 2010 to Fourth Office Action mailed Dec. 4, 2009", 7 pgs.
"Chinese Application Serial No. 200580018092.5, Second Office Action mailed Feb. 6, 2009", (w/ English Translation), 13 pgs.
"Chinese Application Serial No. 200580018092.5, Third Office Action dated Jun. 19, 2009", (w/ English Translation), 33 pgs.
"Chinese Application Serial No. 200580018178.8, Office Action mailed May 8, 2009", 8 pgs.
"Chinese Application Serial No. 200580018178.8, Response filed Nov. 23, 2009 to Office Action dated May 8, 2009", 7 pgs.
"Chinese Application Serial No. 200580018178.8, Second Office Action mailed Jun. 11, 2010", (English Translation), 10 pgs.
"European Application Serial No. 05741066.4, Office Action mailed Feb. 5, 2009", 4 pgs.
"European Application Serial No. 05741066.4, Office Action mailed Sep. 1, 2011", 5 pgs.
"European Application Serial No. 05741066.4, Response filed Jun. 12, 2009 to Communication dated Feb. 5, 2009", 25 pgs.
"European Application Serial No. 05741083.9, Supplementary European Search Report mailed Mar. 2, 2009", 4 pgs.
"European Application Serial No. 11001213.5, Office Action mailed Aug. 30, 2011", 5 pgs.
"European Application Serial No. 05741083.9, Office Action dated Aug. 12, 2011", 5 pgs.
"European Application Serial No. 05741083.9, Office Action mailed Mar. 19, 2010", 9 pgs.
"European Application Serial No. 05741083.9, Response filed Sep. 29, 2010 to Office Action mailed Mar. 19, 2010", 16 pgs.
"International Application Serial No. PCT/CA2005/000663, International Search Report mailed Aug. 30, 2005", 2 pgs.
"International Application Serial No. PCT/CA2005/000663, Written Opinion mailed Aug. 30, 2005", 6 pgs.
"International Application Serial No. PCT/CA2005/000669, International Search Report mailed Aug. 18, 2005", 2 pgs.
"International Application Serial No. PCT/CA2005/000669, Written Opinion mailed Aug. 18, 2005", 5 pgs.
"International Application Serial No. PCT/CA2008/001713, International Search Report mailed Jan. 5, 2009", 3 pgs.
"International Application Serial No. PCT/CA2008/001713, Written Opinion mailed Jan. 5, 2009", 4 pgs.
"International Application Serial No. PCT/CA2009/000253, International Search Report mailed Jun. 12, 2009", 4 pgs.
"International Application Serial No. PCT/CA2009/000253, Written Opinion mailed Jun. 12, 2009", 7 pgs.

(56) References Cited

OTHER PUBLICATIONS

McLean, G. F., "Flexible Fuel Cell", U.S. Appl. No. 60/975,132, filed Sep. 25, 2007, 20 pgs.
Schrooten, J., et al., "Electrochemical Cell and Membranes Related Thereto", U.S. Appl. No. 61/025,739, filed Dec. 1, 2009, 27 pgs.
Schrooten, J., et al., "Fluid Manifold and Method Therefor", U.S. Appl. No. 12/053,366, filed Mar. 21, 2008, 37 pgs.
Schrooten, J., et al., "Fuel Cell Systems Including Space-Saving Fluid Plenum and Related Methods", U.S. Appl. No. 12/238,241, filed Sep. 25, 2008, 36 pgs.
"European Application Serial No. 05741066.4, Office Action mailed May 2, 2012", 5 pgs.
"European Application Serial No. 05741066.4, Response filed Mar. 12, 2012 to Office Action mailed Sep. 1, 2011", 21 pgs.
"European Application Serial No. 08800400.7, Supplementary European Search Report mailed Jun. 29, 2012", 7 pgs.
"European Application Serial No. 11001213.5, Partial European Search Report mailed May 7, 2012", 15 pgs.
"Singaporean Application Serial No. 201006260-2, Amendment filed Mar. 18, 2011", 6 pgs.
"Singaporean Application Serial No. 201006260-2, Examination Report mailed Oct. 6, 2011", 8 pgs.
"U.S. Appl. No. 12/238,241, Response flied Aug. 10, 2012 to Final Office Action mailed Apr. 10, 2012", 8 pgs.
"European Application Serial No. 05741066.4, Response filed Oct. 5, 2012 to Office Action mailed May 2, 2012", 30 pgs.
"European Application Serial No. 09714121.2, European Search Report mailed Aug. 3, 2012", 9 pgs.
"European Application Serial No. 12161876.3, European Search Report maiied Jul. 13, 2012", 13 pgs.
"U.S. Appl. No. 12/126,811 , Response filed Nov. 15, 2011 to Final Office Action mailed Aug. 3, 2011", 14 pgs.
"U.S. Appl. No. 12/238,241, Non Final Office Action mailed Nov. 25, 2011", 11 pgs.
"European Application Serial No. 11001213.5, Response filed Nov. 9, 2011 to Office Action mailed Aug. 30, 2011", 10 pgs.
"U.S. Appl. No. 12/238,241 , Response filed Apr. 17, 2013 to Non Final Office Action mailed Dec. 17, 2012", 16 pgs.
"U.S. Appl. No. 12/238,241, Examiner Interview Summary mailed Apr. 11, 2013", 3 pgs.
"European Application Serial No. 05741066.4, Response filed May 10, 2013 to Examination Notification Art. 94(3) mailed Nov. 13, 2012", 67 pgs.
"European Application Serial No. 08800400.7, Response filed Jan. 28, 2013 to Supplementary European Search Report mailed Jun. 29, 2012", 18 pgs.
"Japanese Application Serial No. 2010-526122, Office Action mailed Apr. 2, 2013", w/English translation, 14 pgs.
"U.S. Appl. No. 12/238,241, Non Final Office Action mailed Dec. 17, 2012", 17 pgs.
"U.S. Appl. No. 13/535,880, Restriction Requirement mailed Nov. 26, 2012", 6 pgs.
"European Application Serial No. 05741066.4, Office Action mailed Nov. 13, 2012", 5 pgs.
"European Application Serial No. 05741066.4, Supplementary European Search Report mailed May 2, 2008", 3 pgs.
"European Application Serial No. 11001213.5, Amendment filed Dec. 6, 2012", 15 pgs.
"International Application Serial No. PCT/CA2005/000663, International Preliminary Report on Patentability dated Nov. 7, 2006", 7 pgs.
"International Application Serial No. PCT/CA2009/000253, International Preliminary Report on Patentability dated Aug. 31, 2010", 8 pgs.
"International Application Serial No. PCT/CA2088/001713, International Preliminary Report on Patentability dated Mar. 30, 2010", 5 pgs.
"U.S. Appl. No. 12/126,811, Preliminary Amendment mailed Jun. 2, 2008", 10 pgs.

"U.S. Appl. No. 13/535,880, Response filed Jan. 15, 2013 to Restriction Requirement mailed Nov. 26, 2012", 7 pgs.
"European Application Serial No. 12161876.3, Response filed Feb. 15, 2013 to Extended European Search Report mailed Jul. 13, 2012", 16 pgs.
"Indian Application Serial No. 6846/DELNP/2010, Request for Examination filed Feb. 23, 2012", 13 pgs.
"U.S. Appl. No. 11/290,647, Examiner Interview Summary mailed Oct. 17, 2006", 2 pgs.
"U.S. Appl. No. 12/126,811, Notice of Allowance mailed Mar. 21, 2013", 9 pgs.
"U.S. Appl. No. 13/535,880, Non Final Office Action mailed Mar. 14, 2013", 10 pgs.
"Chinese Application Serial No. 200980110830.7, Response filed Mar. 28, 2013 to Office Action mailed Dec. 20, 2012", 11 pgs.
"European Application Serial No. 09714121.2, Response filed Feb. 27, 2013 to Extended European Search Report mailed Aug. 3, 2012", 18 pgs.
"European Application Serial No. 11001213.5, Examination Notification Art. 94(3) mailed Jan. 16, 2013", 5 pgs.
"U.S. Appl. No. 14/152,043, Response filed Jun. 25, 2014 to Non Final Office Action mailed Mar. 27, 2014", 9 pgs.
"Canadian Application Serial No. 2,714,991, Response filed Sep. 9, 2014 to Office Action mailed Apr. 9, 2014", 42 pgs.
"Japanese Application Serial No. 2010-547930, Office Action mailed Aug. 25, 2014", (w/ English Translation), 5 pgs.
"Japanese Application Serial No. 2013-199122, Office Action mailed Jul. 15, 2014", (w/ English Translation), 9 pgs.
"U.S. Appl. No. 12/238,241, Notice of Allowance mailed Apr. 2, 2014", 10 pgs.
"U.S. Appl. No. 12/238,241, Response filed Dec. 17, 2013 to Final Office Action mailed Jul. 17, 2013", 14 pgs.
"U.S. Appl. No. 14/152,043, Non Final Office Action mailed Mar. 27, 2014", 10 pgs.
"Application Serial No. PCT/CA2005/000669, International Preliminary Report on Patentability mailed Nov. 7, 2006", 6 pgs.
"Canadian Application Serial No. 2,714,991, Office Action mailed Apr. 9, 2014", 4 pgs.
"European Application Serial No. 05741083.9, Amendment filed May 28, 2009", 17 pgs.
"European Application Serial No. 05741083.9, Response filed Nov. 27, 2013 to Office Action mailed Jun. 20, 2013", 18 pgs.
"European Application Serial No. 11001213.5, Examination Notification Art. 94(3) mailed Mar. 28, 2014", 4 pgs.
"European Application Serial No. 12161876.3, Office Action mailed May 13, 2013", 5 pgs.
"European Application Serial No. 12161876.3, Response filed Nov. 18, 2013 to Office Action mailed Jul. 18, 2013", 23 pgs.
"Japanese Application Serial No. 2010-526122, Amendment filed Sep. 26, 2011", w/English claims, 10 pgs.
"Japanese Application Serial No. 2010-526122, Response filed Sep. 26, 2013 to Office Action mailed Apr. 2, 2013", w/English claims, 10 pgs.
"Japanese Application Serial No. 2010-547930, Office Action mailed Dec. 18, 2013", w/English translation, 8 pgs.
"Japanese Application Serial No. 2010-547930, Response filed Mar. 17, 2014 to Office Action mailed Dec. 18, 2013", w/English claims, 17 pgs.
"Korean Application Serial No. 10-2010-7021778, Response filed Nov. 20, 2013 to Office Action mailed Aug. 20, 2013", w/English claims, 41 pgs.
"U.S. Appl. No. 14/152,043, Response filed Dec. 10, 2014 to Final Office Action mailed Sep. 10, 2014", 6 pgs.
"U.S. Appl. No. 14/540,873, Preliminary Amendment filed Nov. 19, 2014", 6 pgs.
"Canadian Application Serial No. 2,714,991, Office Action mailed Oct. 1, 2014", 5 pgs.
"Japanese Application Serial No. 2010-547930, Response filed Nov. 21, 2014 to Office Action mailed Aug. 25, 2014", (w/ English Translation of Amended Claims), 82 pgs.
"U.S. Appl. No. 12/238,241, Examiner Interview Summary mailed Oct. 21, 2013", 4 pgs.

(56) References Cited

OTHER PUBLICATIONS

"U.S. Appl. No. 12/238,241, Final Office Action mailed Jul. 17, 2013", 13 pgs.

"U.S. Appl. No. 13/535,880, Notice of Allowance mailed Aug. 27, 2013", 8 pgs.

"U.S. Appl. No. 13/535,880, Response filed Jun. 11, 2013 to Non Final Office Action mailed Mar. 14, 2013", 9 pgs.

"European Application Serial No. 05741083.9, Examination Notification Art. 94(3) mailed Jun. 20, 2013", 5 pgs.

"European Application Serial No. 11001213.5, Response filed Jul. 23, 2013 to Office Action mailed Jan. 16, 2013", 23 pgs.

"European Application Serial No. 5741066.4, Examination Notification Art. 94(3) mailed Jul. 1, 2013", 6 pgs.

"European Application Serial No. 5741066.4, Response filed Sep. 10, 2013 to Examination Notification Art. 94(3) mailed Jul. 1, 2013", 8 pgs.

"Korean Application Serial No. 10-2010-7021778, Office Action mailed Aug. 20, 2013", w/English translation, 15 pgs.

\* cited by examiner

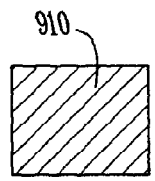 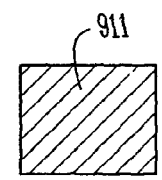
Fig. 9A
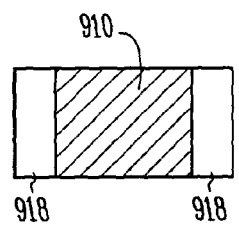 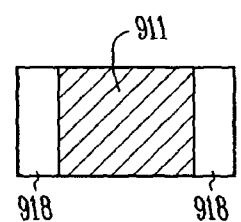
Fig. 9B
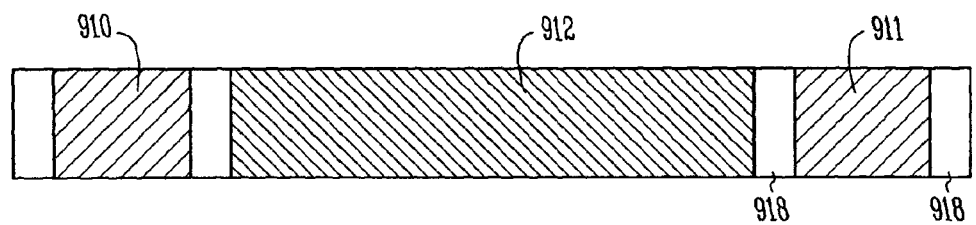
Fig. 9C
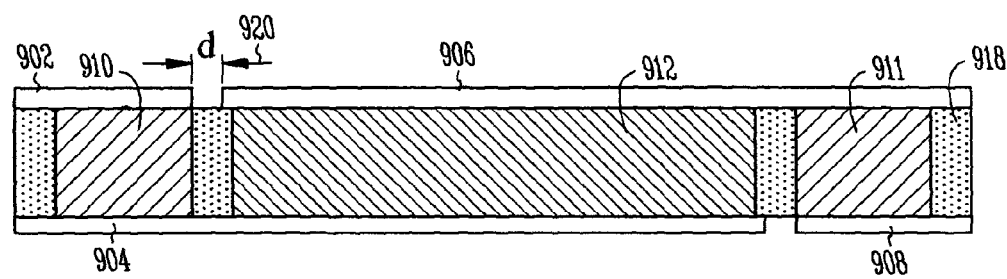
Fig. 9D

ELECTROCHEMICAL CELL AND MEMBRANES RELATED THERETO

RELATED APPLICATIONS

This application is a U.S. National Stage Filing under 35 U.S.C. 371 from International Patent Application Serial No. PCT/CA2009/000253, filed Feb. 27, 2009, and published on Sep. 3, 2009 as WO 2009/105896 A1, which claims the priority benefit of U.S. Provisional Application Ser. No. 61/032,909, filed Feb. 29, 2008, the contents of which are incorporated herein by reference in their entirety.

BACKGROUND

Electrochemical cells, such as fuel cells, include pathways for the transport of charged species. Ions from electrochemical reactions are transported through an ion-exchange membrane of a fuel cell, such as a proton exchange membrane, and electrons are transferred between adjacent fuel cells. Specifically, a path for proton conductivity can be integrated within the fuel cell while a path for electron conductivity is created between adjacent fuel cells to provide an electrical circuit from the overall positive and negative electrical connections of the fuel cell device. Bipolar fuel cells are arranged to provide an electrical current flow in a direction opposite to an ion flow through the membrane. Alternately, edge-collected fuel cells provide electrical current flow parallel to the membrane while ion flow occurs through the membrane.

Systems having electrochemical cells may be used to supply power to portable or large-scale applications. Electrochemical cells having space-saving architectures can be used to reduce the footprint of the power supply relative to the overall system. Batteries for such applications exist. However, existing battery architectures pose safety concerns under stress, and fuel cells having thin-film structures deposited on rigid electrolytes, such as solid oxide ceramic electrolytes, exhibit limited structural flexibility. While thin-layer fuel cells having solid polymer electrolytes offer more flexibility, such architectures often rely on additional structural components to provide robustness. However, substrates and structural members consume volume without contributing to energy for power delivery.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 9A-D illustrate cross-sectional views of manufacturing steps in making a composite layer, according to some embodiments.

SUMMARY

Figure 1:
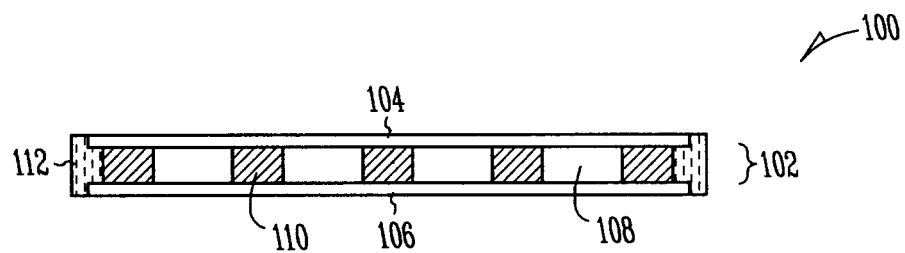
FIG. 1 illustrates a cross-sectional view of an ion-conducting composite layer, according to some embodiments.

Embodiments of the present invention relate to an ion-conducting composite layer for an electrochemical cell. The layer includes two or more electrically conductive components, each electrically conductive component having one or more electrically conductive passageways and one or more dielectric components, each dielectric component having one or more ion-conducting passageways. The electrically conductive components and the dielectric components are adjacently arranged to provide a fluidically impermeable composite layer.

Embodiments also relate to an electrochemical cell array, including a composite layer having a first surface and a second surface. The composite layer includes two or more electrically conductive components, each electrically conductive component having one or more electrically conductive passageways, and one or more dielectric components, each dielectric component having one or more ion-conducting passageways. The electrically conductive components and the dielectric components are adjacently arranged. The array also includes one or more first coatings in contact with the first side of the composite layer and one or more second coatings in contact with the second side of the composite layer. Each first coating is in contact with at least one of the ion-conducting passageways of a first dielectric component and in electrical contact with at least one of the electrically conductive passageways of a first electrically conductive component. Each second coating is in contact with at least one of the ion-conducting passageways of a second dielectric component and in electrical contact with the at least one electrically conductive passageways of the first electrically conductive component, sufficient to provide an electrically conductive pathway from the first side of the composite layer to the second side of composite layer between adjacent electrochemical cells in the array.

Embodiments of the present invention relate to an electrochemical cell array. The array includes a composite layer having a first side and a second side. The composite layer includes a plurality of dielectric components, each dielectric component having at least one ion-conducting passageway and at least one electrically conductive component, each component having at least one electrically conductive passageway. The electrically conductive component is disposed adjacent one or more of the dielectric components. The array also includes at least two electrochemical cells positioned to form an array along the composite layer. Each electrochemical cell includes one of the dielectric components disposed between the first and second surfaces, an anode layer disposed on a first surface of the one dielectric component and a cathode layer disposed on a second surface of the one dielectric component. The ion-conducting passageway of the one dielectric component ionically connects the anode layer and the cathode layer, and pairs of adjacent electrochemical cells in the array are coupled to a common electrically conductive component.

Embodiments also relate to an electrochemical system including an electrochemical cell array and one or more fluidic plenums. The one or more fluidic plenums are at least partially defined by the electrochemical cell array Embodiments also relate to a method of forming an electrochemical layer, including forming at least one electrically conductive component and adhering at least one interface region to a surface of each electrically conductive component. The method also includes forming at least one dielectric component by casting an ionomer dispersion in proximity to a corresponding interface region and in contact with the interface region, curing the ionomer dispersion sufficient to form a fluidically impermeable composite layer and disposing at least one coating on a first surface of the composite layer. The coating is in contact with one dielectric component, an adjacent electrically conductive component, and an interface region.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the present invention relate to electrochemical cells such as fuel cells, electrolyzers, and batteries, and may also have application in other types of electrochemical cells, such as those used for chlor-alkali processing. Some embodiments of the invention provide electrochemical cell layers comprising arrays of individual or "unit" cells. Arrays may be substantially planar or cylindrical, for example.

Any suitable type of fuel cell and appropriate materials can be used according to the present invention. The electrolyte may comprise, for example, a proton exchange membrane. Certain embodiments of the invention permit construction of an electrochemical cell layer comprising a plurality of individual unit cells formed on the electrolyte.

An electrochemical cell layer including a plurality of unit cells may be constructed by providing a substrate including a plurality of ion conducting regions. Such a substrate could be provided, for example by selectively treating a sheet of non- or partially-conducting material to form the ion conducting regions, or by selectively treating a sheet of ion conducting material to form non-conducting regions, as described, for example in the commonly-owned application US Pub. No. 2005/0249994, filed 2 Feb. 2005, entitled "MEMBRANES AND ELECTROCHEMICAL CELLS INCORPORATING SUCH MEMBRANES", the disclosure of which is herein incorporated by reference. Unit cells according to the invention may be used in a planar electrochemical cell layer that is conformable to other geometries, as described in commonly-owned U.S. Pat. No. 7,474,075, entitled "DEVICES POWERED BY CONFORMABLE FUEL CELLS" and commonly owned U.S. application Ser. No. 12/238,241, filed 25 Sep. 2008, entitled "FUEL CELL SYSTEMS INCLUDING SPACE-SAVING FLUID PLENUM AND RELATED METHODS," which are hereby incorporated by reference.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized.

Array may refer to a plurality of individual unit cells. The plurality of cells may be formed on a sheet of ion exchange membrane material, a substrate, or may be formed by assembling a number of components in a particular manner. Arrays can be formed to any suitable geometry. Examples of planar arrays of fuel cells are described in commonly-owned U.S. application Pub. No. 2005/0250004 filed on 2 Feb. 2005 entitled "ELECTROCHEMICAL CELLS HAVING CURRENT CARRYING STRUCTURES UNDERLYING ELECTROCHEMICAL REACTION LAYERS", referred to above. Fuel cells in an array can also follow other planar surfaces, such as tubes as found in cylindrical fuel cells. Alternately or in addition, the array can include flexible materials that can be conformed to other geometries.

Embodiments of the present invention relate to electrochemical cells providing structural flexibility without reliance on structural components that are electrochemically inactive. The present invention provides an ion-conducting membrane having active functional members that can be coordinated to provide an electrochemical cell with robustness and improved form factor flexibility. This functionality allows for flexible coupling with a variety of electrical and structural components, such as a circuit board. Embodiments of the present invention relate to portable electronic applications, as well as larger-scale power applications such as automobiles, boats and forklifts, for example.

DEFINITIONS

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention.

As used herein, "flexible 2D electrochemical cell array" refers to a flexible sheet which is thin in one dimension and which supports a number of electrochemical cells. The fuel cells have active areas of one type (e.g. cathodes) that are accessible from one face of the sheet and active areas of another type (e.g. anodes) that are accessible from an opposed face of the sheet. The active areas may be disposed to lie within areas on their respective faces of the sheet (e.g. it is not mandatory that the entire sheet be covered with active areas, however, the performance of a fuel cell may be increased by increasing its active area). There are various constructions which may be used to make flexible 2D electrochemical cell arrays. Examples of flexible 2D electrochemical cell arrays may be found in commonly-owned U.S. patent application Ser. No. 12/341,294 entitled "ELECTROCHEMICAL CELL ASSEMBLIES INCLUDING A REGION OF DISCONTINUITY", the disclosure of which is herein incorporated by reference and patent application Ser. No. 12/238,241 entitled "FUEL CELL SYSTEMS INCLUDING SPACE-SAVING FLUID PLENUM AND RELATED METHODS", referred to above.

As used herein, "flexible electrochemical layer" refers to an electrochemical layer that is flexible in whole or in part, so-as-to embrace, for example, an electrochemical layer having one or more rigid components integrated with one or more flexible components. Examples of flexible layers and electrochemical layers that may adapted for use in the present invention may be found in commonly-owned McLean, et al., U.S. Patent Application Pub. No. 2006/0127734, entitled "FLEXIBLE FUEL CELL STRUCTURES HAVING EXTERNAL SUPPORT", the disclosure of which is herein incorporated in its entirety.

As used herein, "electrochemical cell array" refers to one or more electrochemical cells configured to form an array that includes individual electrochemical cells that are arranged two-dimensionally in any of various suitable ways on an area covered by the array. For example, active regions of individual electrochemical cells may be arranged to provide columns of substantially parallel stripes, or shapes distributed at nodes of a two-dimensional lattice configuration, which may be a rectangular, square, triangular or hexagonal lattice, for example, and which is not necessarily completely regular. A pattern of shapes distributed in both a width and a length dimension of the area covered by the array may be provided, such that a pattern may be less regular than a lattice-type pattern, for example. Thin layer electrochemical cells, such as fuel cells, may be arranged into arrays constructed of very thin layers. Within such an array, individual unit fuel cells may be electrically coupled in a series or series-parallel arrangement. Electrically coupling fuel cells in such an arrangement may permit electrical power to be delivered from an array of fuel cells at increased voltages and reduced currents. This, in turn, may permit electrical conductors having smaller cross-sectional areas to be used to collect the electrical current.

As used herein, "gas diffusion layers" or "gas permeable layers or material" may refer to one or more porous conductive or dielectric members. For example, the gas diffusion layer may be disposed on a coating or may be integrated in the coating. The gas diffusion layers may also permit passage of gases through the gas diffusion layers to a catalyst layer. Suitable gas diffusion layers may be fabricated using carbon black powders, carbon cloth materials or carbon fiber paper materials, for example. Gas diffusion layers may also be non-carbon materials, or may be a composite of multiple layers of material, which may have differing characteristics. The gas diffusion layer may also include a fuel cell cover, such as described in detail in commonly-owned U.S. patent application Ser. No. 12/238,040, entitled "FUEL CELL COVER", filed Sep. 25, 2008, and in commonly-owned U.S. patent application Ser. No. 12/355,564, entitled "COVERS FOR ELECTROCHEMICAL CELLS AND RELATED METHODS", filed Jan. 16, 2009, the disclosures of which are herein incorporated by reference.

As used herein, "flexible" refers to a layer or component that can be deformed, bent, flexed or plied. Electrochemical cell layers, arrays, composite layers, components or coatings may be partially or substantially flexible in one or more directions.

As used herein, "dielectric material" or "ion-conducting material" refers to a substance exhibiting negligible electrical conductivity. Dielectric materials may be understood to include ion-conducting materials, non-ion-conducting materials, and combinations thereof. Examples of ion-conducting materials include any ionomer or electrolyte suitable to the application, such as ion-exchange polymers, alkaline solutions, and phosphoric acid. Examples of non-ion-conducting materials include polymers, such as polypropylene, polyethylene, polycarbonate, polyimides, polyamides, polyurethane, polyester, fluoropolymers and other polymer films. An example of a polyimide includes Kapton™ film. An example of a fluoropolymer is PTFE (polytetrafluoroethylene) or Teflon™ film. Other fluoropolymers include PFSA (perfluorosulfonic acid), FEP (fluorinated ethylene propylene), PEEK (poly ethylene ether ketones) and PFA (perfluoroalkoxyethylene). Dielectric materials may include thermoset polymers such as epoxies, phenolics, urethanes, and silicone. Dielectric materials may also include reinforced composite materials such as fiberglass, any suitable non polymer materials such as silicon or glass, and combinations thereof. The dielectric material may include an electrolyte, for example. The electrolyte may be a solid electrolyte membrane.

As used herein, "composite layer" refers to a layer including at least two surfaces having a thickness, where one or more ion-conducting passageways are defined between the surfaces and where one or more electrically conducting passageways are defined between the surfaces. Ion-conducting properties and electrical conducting properties of the composite layer can be varied in different regions of the composite layer by defining ion-conducting passageways and electrically conducting passageways with varying sizes, shapes, densities and/or arrangements. The composite layer described herein is capable of providing desired electrical conductivity, ionic conductivity, gas permeability, and mechanical strength characteristics that can be varied at the designer's discretion over the spatial extent of the composite layer. This affords greater design flexibility and allows the local tuning of mechanical and electrical parameters to best meet the competing needs of ion conductivity and mechanical strength within a fuel cell or similar system. As examples, the composite layer may include one or more electrically conductive components such as cell interconnects for providing desired electrical conductivity, ionically conductive components such as electrolytes for providing desired ionic conductivity, and other non-ionically conductive dielectric components (as described below) for reducing gas permeability and/or increasing mechanical strength.

As used herein, "dielectric component" refers to a component of the composite layer including at least one or more ion-conducting passageways. The dielectric component may further include one or more dielectric materials. The dielectric component of the composite membrane can include an ion-conducting material, ion-conducting passageways, a dielectric protective layer, a dielectric skin, a dielectric support structure or some combination thereof. The dielectric component may include a proton exchange membrane component, for example, and may be a sheet of ionically-conductive material, or may be formed by curing an ionomer dispersion, for example. The dielectric component may include fluoropolymer-based ion-conducting material or dispersions, such as perfluorosulfonic acid (PFSA) or perfluorosulfonic acid/PTFE (polytetrafluoroethylene) copolymers in the acid (H+) form, or may include hydrocarbon-based ion conducting material or dispersions. The dielectric components may further include an elasticizing agent, a cross-linking agent, a photoinitiator, a thermally curable initiator or combinations thereof. The elasticizing agent may be acrylonitrile. The photoinitiator may include benzyl ketals, acetophenomes, zanthones or a combination thereof.

As used herein, a "conductive component" refers to an area or component of the composite layer which is electrically conductive. A conductive component may be an area of the surface of the composite layer and may also include aspects disposed on or integral to the composite layer. A conductive component may for example, form "cell interconnects", electrically conductive components which provide an electrical connection between adjacent cells and enable electricity to be extracted from the electrochemical layer. The conductive component may further be in electrical contact with a "conductive region" of the electrochemical cell. The conductive region may include exposed surfaces of the cell interconnects underlying a coating such as a catalyst layer, a conductive gas diffusion layer, other suitable conductive members, or some combination thereof. The conductive component and conductive region may be manufactured from metals that are noble or are metals coated with a corrosion resistant layer, such as PEMCoat™ from INEOS Chlor™ Americas Inc., Wilmington, Del. or from conductive non-metals such as metals, metal foam, carbonaceous materials, graphite composite, conductive epoxy, carbon, graphite, carbon fibers, carbon nanotubes, electrically conductive ceramics, electrically conductive polymers or combinations thereof. In addition, parts of the conductive region may also be ionically conductive.

As used herein, "discontinuity region" or "insular break" may refer to an area on the surface of the composite layer that provides electrical separation between conductive regions.

As used herein, "coating" refers to a conductive thin-layer disposed on the surface of a composite layer. For example, the coating may be a catalyst layer or electrodes, such as anodes and cathodes.

As used herein, "catalyst" refers to a material or substance that assists in starting or increasing the rate of a reaction, without being modified or consumed itself. Catalyst layers may comprise any type of electrocatalyst suitable for the application at hand. Catalysts or catalyst layers may include pure platinum, carbon-supported platinum, platinum black, platinum-ruthenium, palladium, copper, tin oxide, nickel, gold, mixtures of carbon black and one or more binders. Binders may include ionomers, polypropylene, polyethylene, polycarbonate, polyimides, polyamides, fluoropolymers and other polymer materials, and may be films, powders, or dispersions. An example of a polyimide includes Kapton™. An example of a fluoropolymer is PTFE (polytetrafluoroethylene) or Teflon™. Other fluoropolymers include PFSA (perfluorosulfonic acid), FEP (fluorinated ethylene propylene), PEEK (poly ethylene ether ketones) and PFA (perfluoroalkoxyethylene). The binder may also include PVDF (polyvinylidene difluoride) powder (e.g., Kynar™) and silicon dioxide powder. The binder may include any combination of polymers or ionomers. The carbon black may include any suitable finely divided carbon material such as one or more of acetylene black carbon, carbon particles, carbon flakes, carbon fibers, carbon needles, carbon nanotubes, and carbon nanoparticles.

As used herein, "current collecting area" or "current collector" refers to an area of a coating, layer or catalyst layer in contact with an electrically conductive component of the composite layer.

As used herein, "cell interconnect" refers to an electrically conducting member that electrically communicates electrodes of two or more fuel cell units. The cell interconnect may include any one of the electrically conducting passageways of the composite layer and/or a terminal current collector for communicating the array with an external circuit.

As used herein, "electrode regions" or "electrodes" refer to materials or components that act as anodes, cathodes or both in an electrochemical reaction. The electrode region or electrode may be part of the conductive components or a composite layer, a coating or both. Electrodes may include a catalyst layer, a gas permeable material, or both.

Referring to FIG. 1, a cross-sectional view 100 of an ion-conducting composite layer or membrane is shown, according to some embodiments. A composite layer 102 may include electrically conductive components and dielectric components. The electrically conductive components 110 may include cell interconnects for an electrochemical assembly. Electrically conductive components 110 may include electrically conductive passageways extending through the composite layer 102. For example, electrically conductive components 110 may include cell interconnects of an electrochemical array or terminal current collectors, or both. Dielectric components 108 may include one or more ion-conducting passageways extending through the composite layer 102. For example, dielectric components 108 may include an ion-conducting material, such as an electrolyte material. The components 108, 110 may be adjacently arranged. The surface of the composite layer 102 may be adapted to the application for which it is intended. For example, in embodiments where the layer forms part of a fuel cell, it may be very large for applications requiring large amounts of power, or may be very small for applications which do not require much power (e.g. portable electronic devices). The surface of the layer may exceed several square meters, or may be less than or equal to about 200 square centimeters, about 100 centimeters, about 50 square centimeters or about 25 square centimeters, for example. Further examples of sizes, shapes and applications of the layer may be found in commonly-owned U.S. Pat. No. 7,474,075, entitled "DEVICES POWERED BY CONFOR-MABLE FUEL CELLS", referred to above.

The composite layer 102 may also include coatings 104, 106 that may be arranged along portions of a surface of the composite layer or across the entire surface. Coatings 104, 106 may be discontinuous. Further, the ion-conducting composite layer may include a perimeter 112 surrounding the composite layer 102. The perimeter 112 may function to seal a reactant on a first surface of the composite layer and be electrically conductive and/or dielectric. In one example, the perimeter 112 may include one or more terminal current collectors. As such, cell interconnects, such as terminal current collectors, may provide electrical conductivity and sealing, for example.

The composite layer 102 may include a first surface and a second surface, the second surface opposite the first. The electrically conductive components 110 of the composite layer may include electrically conductive passageways that extend from a first side of the composite layer to a second side of the composite layer. The one or more electrically conductive passageways and one or more ion-conducting passageways extend substantially through one or more dimensions of the composite layer. The dimensions may include one or more of height, width or length. Electrically-conducting passageways include an electrically conductive material. The dielectric components 108 of the composite layer 102 may include ion-conducting passageways that extend from a first side of the composite layer 102 to a second side of the composite layer 102. Ion-conducting passageways include an ion-conducting material having an ionic conductivity greater than that of the electrically conductive portions. In some embodiments, ion-conducting material is an ionomeric material. Optional coatings 104, 106 may also include ion-conducting material. The thickness of the composite layer may be less than about 5 mm, less than about 2 mm, less than about 500 microns, less than about 200 microns or less than about 50 microns, for example.

The composite layer may 102 be substantially impermeable, such as fluidically impermeable. The composite layer 102 may be substantially fluidically impermeable at a pressure differential of at or below about 5 psi, at or below about 15 psi or at or below about 30 psi. The permeability of the composite layer 102 may be at or below about 0.08 grams per hour of hydrogen gas, at or below about 0.016 grams per hour or at or below about 0.0032 grams per hour.

The composite layer 102 may be a flexible electrochemical cell layer. The components 108, 110 may each individually or together be flexible, for example. The two or more electrically conductive components 110 may be flexible, for example, or alternately, the electrically conductive components 110 may be substantially rigid and the dielectric components 108 may be flexible, or both the electrically conductive components 110 and the dielectric components 110 may be flexible in one or more dimensions. The dielectric components 108 and/or the electrically conductive components 110 may include a filler material to reduce fluidic transport across the composite layer. The filler material may be used to form an interface region between the dielectric components and the electrically conductive components to promote or enhance sealing of the layer. For example, an epoxy filler may be disposed within the electrically conductive material. Examples of fillers include a sealant, silicon material, epoxy, adhesive material, binder material, filler material, polymer or a combination thereof. Further, the ion-conducting components 108 and the electrically conductive components 108 of the composite layer 102 may interact at interfaces between the dielectric 108 and electrically conductive components 110 to provide a hermetic seal.

Ion-conducting materials of the dielectric components 108 may chemically, physically or mechanically bond with electrically conductive materials. The bonding may be a combination of chemical and physical means. Materials included in the dielectric and electrically conductive portions may exhibit properties that may improve bonding. It may be challenging to obtain satisfactory bonds at interfaces between components 108 and 110. The bonds may need to meet various mechanical and chemical requirements with regard to strength, permeability, flexibility, corrosion resistance and the like. Further, the bonds may need to be reliable and durable. However, it may be difficult to achieve suitable bonds between dielectric materials and electrically conductive materials (e.g. between ionomer materials and carbon materials). In this respect, it may be beneficial to utilize and interface region to promote bonding between the dielectric components 108 and the electrically conductive components 110.

Electrically conductive components 110 may further include additive materials to increase tensile strength, durability, or toughness, to reduce porosity of the electrically conductive components 110, or otherwise alter one or more properties of the electrically conductive components 110. Bonds between coatings 104, 106 and the composite layer 102 may also add tensile strength to the composite layer. The conductive components 110 may include carbon fibers that extend from a first surface of the composite layer 102 to a second surface of the composite layer 102. The components 110 may include carbon fibers that extend parallel to a surface of the composite layer 102. The components 110 may include a metal, a metal foam, a carbonaceous material, a graphite composite, a conductive epoxy, a conductive polymer (e.g. polyaniline), a conductive ceramic, pultruded composites, carbon fiber, expanded graphite, woven carbon cloth, graphite, vitreous carbon, carbon, epoxy, graphite filled epoxies, graphite filled polymers, or combinations thereof, for example. The components 110 may include composite structures including carbon and an epoxy, for example, such as a woven carbon cloth impregnated with an epoxy.

Dielectric components 108 of composite layer 102 may further include micro-structures. A "micro-structure" is a structure capable of being revealed by a microscope having a magnification of 5 times or more. The microstructures may be electrically conductive or dielectric and may provide higher surface area interfaces between the dielectric components 108 and electrically conductive components 110. Microstructures may include a polymer matrix. Examples of polymer matrices include polybenzimidazole, and silicon carbide. The composite layer 102 may include ion-conducting passageways and electrically conductive passageways where one or both are created from a unitary sheet of material, such as precursors. For example, the composite layer 102 may include ion-conducting passageways formed in a resin precursor. In one embodiment, the passageways each have a path length equal to the thickness (Lcore) of composite layer 102. In other words, the passageways may have tortuosity factors of 1, where tortuosity is equal to the distance that a particle must travel to pass through composite layer 102 divided by the thickness (Lcore) of any substrate.

The electrically conductive components 110 may form a closed path, or a substantially closed path around a periphery of a region on a surface of the composite layer. In the case of a substantially closed path, the electrically conductive components may substantially surround the dielectric components, but may include a discontinuity rather than being continuous. The components 110 may form traces with a circular, elliptical, rectangular, hexagonal or polygonal geometry. The components 110 may be positioned in a regular array. The dielectric components 108 and electrically conductive components 110 may be positioned in a concentric arrangement. The components 108, 110 may be positioned in strips, such as in alternating strips. Each strip may be less than about 2 millimeters in width, for example. A composite layer 102 may include ten or more electrically conductive components 110. The layer may include more than twenty electrically conductive components 110 or more than fifty electrically conductive components 110 or more than several hundred electrically conductive components.

Figure 2:
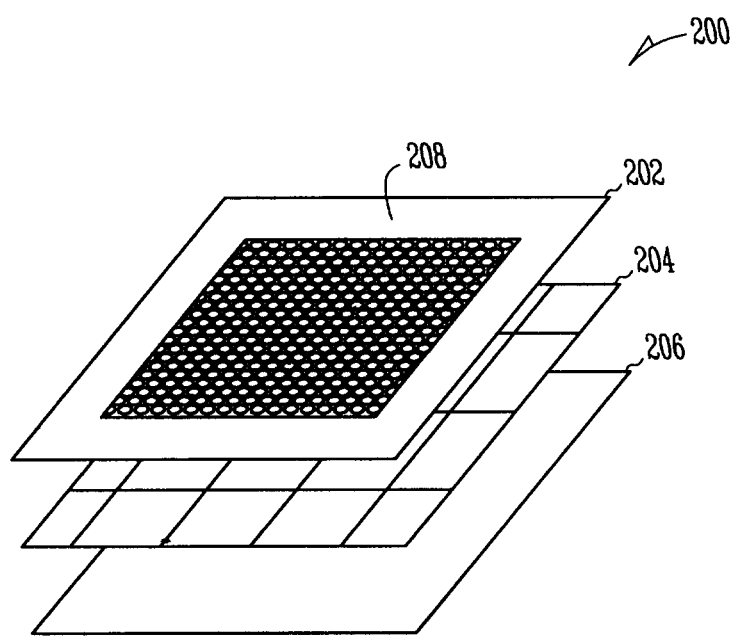
FIG. 2 illustrates a perspective view of an ion-conducting composite layer, according to some embodiments.

Referring to FIG. 2, a perspective view 200 of an electrochemical array or composite layer is shown, according to some embodiments. Electrically conductive components 208 may be positioned in many ways relative to the dielectric component 202. The dielectric component 202 and electrically conductive components 208 may be arranged in any suitable pattern. Further planar layers 204, 206 may be contacted to form a composite layer or electrochemical cell.

Figure 3:
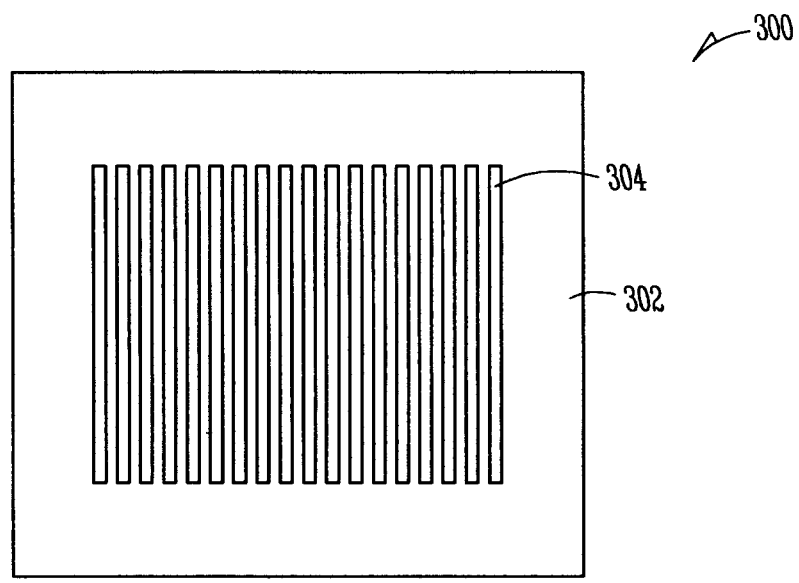
FIG. 3 illustrates a vertical view of a composite layer, according to some embodiments.
Figure 4:
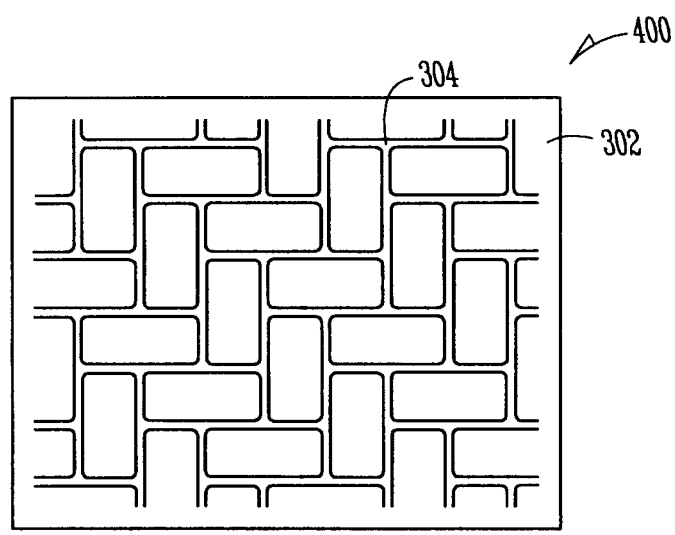
FIG. 4 illustrates a vertical view of a composite layer, according to some embodiments.
Figure 5:
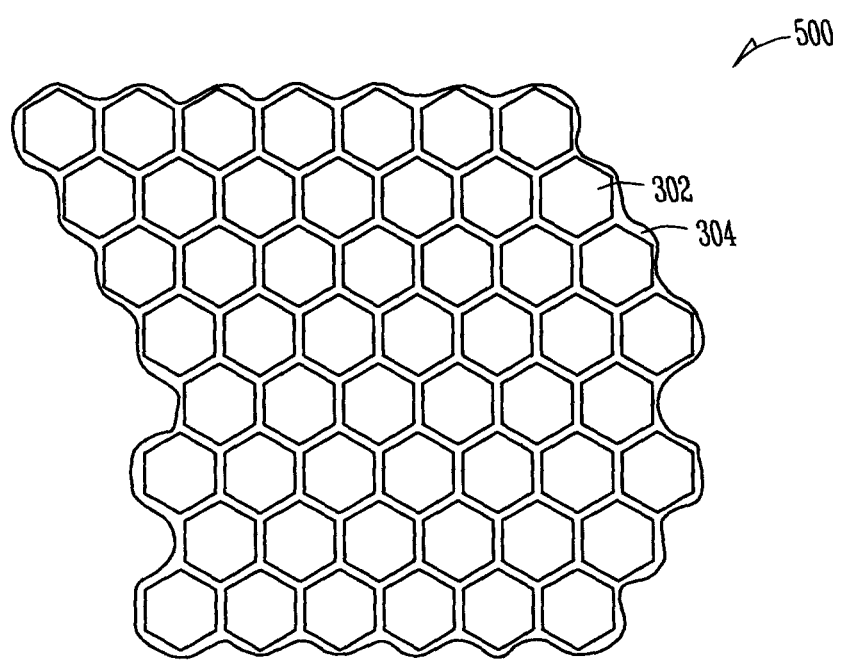
FIG. 5 illustrates a vertical view of a composite layer, according to some embodiments.

Referring to FIG. 3, a vertical view 300 of an electrochemical array or composite layer is shown, according to some embodiments. Electrically conductive components 304 may be arranged in numerous orientations or geometries. For example, conductive components 304 may be arranged in strips that alternate with the dielectric components 302. Other examples include the dielectric components 302 or the electrically conductive components 304 being located at nodes of a square or rectangular array, a triangular array, or a hexagonal array. The ion-conducting components and electrically conductive components may be shaped round as illustrated in FIG. 2, or may have other shapes or patterns, such as cross shapes, a herringbone pattern (see FIG. 4), hexagonal shapes (see FIG. 5), honeycomb configuration, concentric circles, oval-shapes, elliptical shapes, star shapes or combinations thereof. They may be geometrically arranged substantially in parallel, for example. The components may be irregularly shaped and have an asymmetrical pattern as well.

Electrically conductive passageways may be integrated in an electrically conductive component or components and ion-conducting passageways may be integrated in a dielectric component or components. The adjacent components may be bonded or interact. The components may be hermetically bonded. The electrically conductive components 304 may include a first material and the dielectric components 302 may include a second material. The first and second materials may interact. The materials may interact chemically or physically, for example. The first material may be carbonaceous, for example. The second material may be an ionomer or a solvent, for example.

Figure 6:
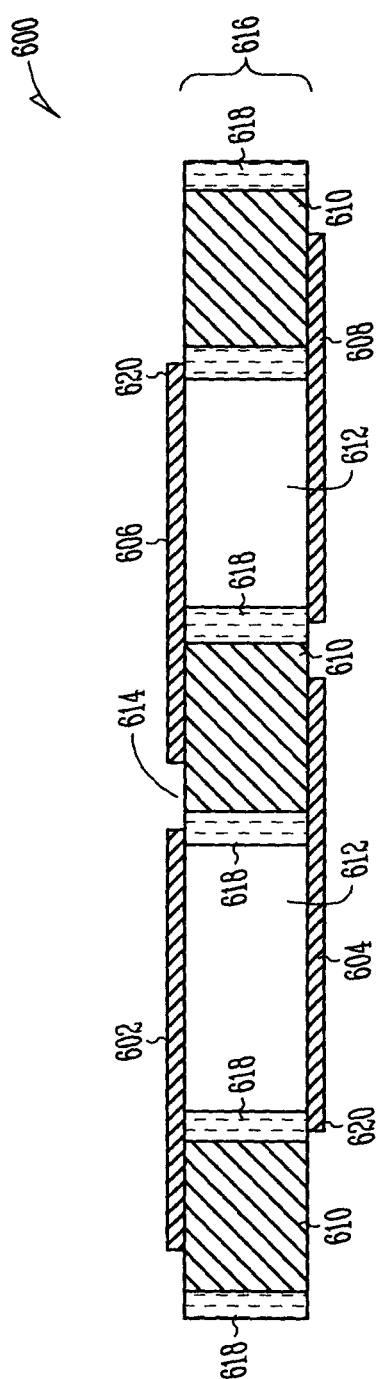
FIG. 6 illustrates a cross-sectional view of an electrochemical cell layer, according to some embodiments.

Referring to FIG. 6, a cross-sectional view 600 of a composite layer is shown, according to some embodiments. Coatings 602, 604, 606, 608 may be in contact with a composite layer 616. In some embodiments, the coatings may be electrically conductive, ionically conductive and catalytically active. A region of discontinuity 614 may separate and electrically insulate adjacent conductive coatings 602, 606 and 604, 608 along the surface of each side of the composite layer 616. The composite layer 616 may include electrically conductive components and dielectric components. In the embodiment shown in FIG. 6, composite layer 616 also comprises interface regions 618 between the electrically conductive components (or cell interconnects) 610 and the ionomer electrolytes 612. Interface regions 618 may be made of an electrically non-conductive and ionically non-conductive dielectric material (e.g. polyester, epoxy, phenolics, urethanes, silicone) and the edges of coatings 602, 604, 606, and 608 may be located within the widths of these interface regions 618 (e.g. at locations 620 in FIG. 6). Regions 618 may be sufficiently wide such that the coating edges can be located thereon within a given tolerance, for example, a tolerance required to enable a manufacturing process. In this way, regions 618 serve to electrically insulate coatings 602, 604, 606, 608 from inadvertent electrical contact with the wrong cell interconnects 610 and thereby undesirably shorting out the associated electrochemical cells. The thickness of the interface region may be as small as about 15 micrometers, for example. Or, the thickness of the interface region may be about 100 micrometers or about 200 micrometers or greater. The thickness of the interface region may be chosen so as to enable a tool or a machine of a given radius to form an electrical discontinuity between coatings of adjacent electrochemical cells. The tolerance may include a minimum distance required to form and maintain electrical insulation between adjacent coatings. Use of this design may be particularly important when using certain ionomer electrolytes, such as perfluorosulfonic acid copolymers, to enable manufacturing. Additionally, with this design, coatings 602, 604, 606, 608 can still cover the full surface of electrolytes 612 thereby making maximum use of the available surface area of electrolytes 612, the available electrochemical reaction sites, and therefore also increasing potential power density per unit area of the array as a whole.

By having a substantial overlap or contact between the coatings 602, 604 and cell interconnects 610, a more effective transfer of an electric current from the electrochemical reaction sites (within the coatings or at the interface of the coatings and the composite layer, for example) to the cell interconnect results.

Coatings 602, 604, 606, 608 may include a first coating on a first surface of the composite layer and a second coating on a second surface of the composite layer. The coatings 602, 604, 606, 608 may include electrically conductive material, ion-conducting material or both. A first coating may be an anode layer with a second coating including a cathode layer. The anode layers and cathode layer may be electrically conductive and include electrically conductive components. The anode and cathode layers may include catalytically active material or ion-conducting material. The cathode and anode layers may include some combination of electrically conductive material, catalytically active material and ion-conducting material (dielectric).

Figure 7:
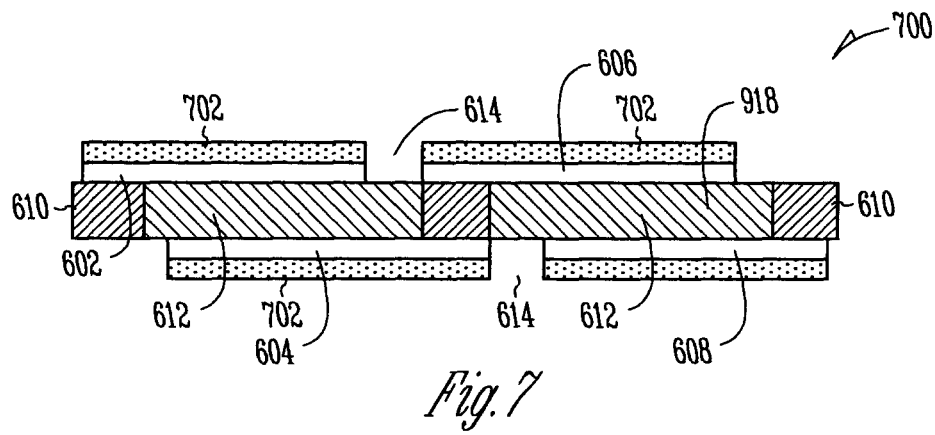
FIG. 7 illustrates a cross-sectional view of an electrochemical cell layer including gas diffusion layers, according to some embodiments.

As illustrated in FIGS. 6 and 7, the coatings 602, 604, 606, 608 may be disposed in a variety of positions relative to the conductive components and the interface regions. The edges of adjacent coatings may be located on the dielectric component 612, on the interface region 618, on the conductive components 610, or combinations thereof, as long as electrical insulation is maintained between adjacent cells. For example, the coatings may be disposed such that the edges of adjacent coatings are both located on the interface region 618. Alternately, as illustrated in FIG. 6, the edge of a first coating (e.g. 602) may be located on the interface region 618, while the edge of an adjacent coating (e.g. 606) may be located on the conductive component 610.

Further still, as illustrated in FIG. 7, the edge of a first coating (e.g. 602) may be located on the dielectric component 612, while the edge of a second coating (e.g. 606) may be located on the interface region (not shown), at the edge of the conductive component 610 (shown), or inwards from the edge of the conductive component (e.g. as illustrated by placement of coatings 604 and 608 in FIG. 7). In the case of a parallel electrical connection (not shown), a coating (e.g. 602) on one surface may extend across adjacent dielectric components 612 and an interposed conductive component 610, so long as coatings in contact with the corresponding dielectric components 612 on the opposite surface (e.g. 604, 608) are electrically isolated from the interposed conductive component 610. Optional gas diffusion layers or gas permeable layers or material 702 (see FIG. 7) may be in contact with the coatings 602, 606 and 604, 608. The gas permeable material 702 may be electrically conductive or dielectric. A dielectric gas permeable material 702 may be coupled to one or both surfaces of a composite layer, for example.

Aside from the presence of gas diffusion layers 702, the embodiment in FIG. 7 differs from that in FIG. 6 in that no substantial interface regions 618 are employed in composite layer 616. Instead, regions of discontinuity 614 separate and electrically insulate adjacent conductive coatings 602, 606 and 604, 608 along the surface of each side of the composite layer 616. In such embodiments, interface regions may still be used to promote bonding between the dielectric components and the conductive components; however, the regions may be very narrow, or for example may be a thin coating on the surface of the conductive components.

Again, electrical shorting of adjacent fuel cell units should be prevented, and the coatings are arranged such that electrical communication between coatings 602 and 606 or 604 and 608, for example is mitigated. The ability of a manufacturing process to produce such a narrow discontinuity 614 influences the performance considerably. However, this and other embodiments allow there to be some imprecision in manufacturing and still obtain a working cell, although possibly with a differing performance than the embodiment shown in FIG. 7.

The composite layer or entire array may be flexible, for example. It may be flexible in one or more directions, or partially curved. The layer may be curved to form a cylindrical layer or spiral bound, such as in a rolled configuration.

A fluidic plenum, for example a fuel or an oxidant plenum, may be in contact with one or more of the coatings 602, 606 and 604, 608, electrolyte 612, one or more of the gas diffusion layers 702, one or more of the cell interconnects 610, or a combination thereof. A fuel or fluid may be hydrogen, for example, although any suitable fuel such as methanol, ammonia, ammonia borane, hydrazine, ethanol, formic acid, butane, borohydride compounds etc. may be utilized. The oxidant may be air or oxygen, for example.

A first plenum may be coupled to a first surface of the composite layer, including a first reactant. A second plenum may be coupled to a second surface of the layer, including a second reactant. Fluidic plenums may include fuel plenums and oxidant plenums, for example. Multiple substantially fluidically impermeable composite layers may be stacked, in which any adjacent composite layers share a fluidic plenum in between. A fluidic plenum may be defined by contact with some or all of one or more composite layers, coatings, electrically conductive components, dielectric components, gas permeable materials, catalyst layers, anode layers, cathode layers, internal support structures, fluidic manifold, current collectors, seals, etc. Examples of current collectors include intermediate current collectors and terminal current collectors. Seals may include intermediate seals, perimeter seals, end seals or combinations thereof. Internal support structures may be structural components or electrically conductive components that function for structural support as well.

The unit cells can be interconnected in various possible ways to create an array of cells, thereby increasing the potential power output of the layer, either by increasing the potential voltage, current output, or combinations thereof. Individual unit cells can be connected in series or in parallel, as described in U.S. application Pub. No. 2005/0250004 filed on 2 Feb. 2005 entitled "ELECTROCHEMICAL CELLS HAVING CURRENT CARRYING STRUCTURES UNDERLYING ELECTROCHEMICAL REACTION LAYERS," referred to above. Electrochemical cell arrays may be connected in series or in parallel as well.

Figure 8:
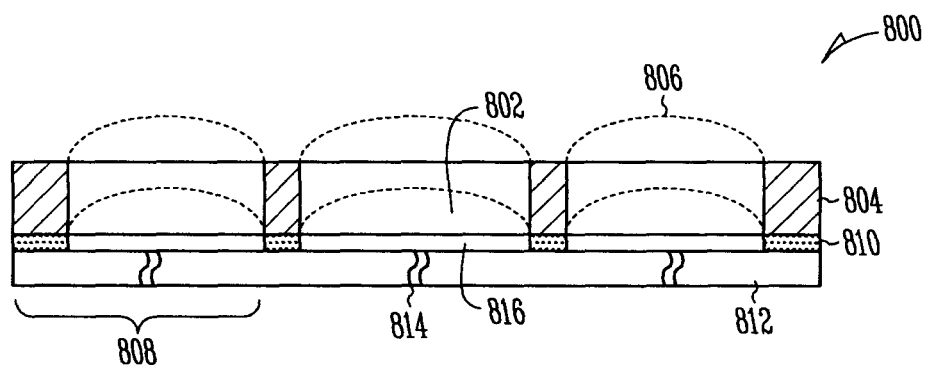
FIG. 8 illustrates a cross-sectional view of an electrochemical cell layer including a flexible plenum, according to some embodiments.

Referring to FIG. 8, a cross-sectional view 800 of an electrochemical cell layer including a flexible plenum is shown, according to some embodiments. A flexible electrochemical cell layer 802 may include discrete regions 808 separated by cell interconnects or internal support structures 804. When a fuel is introduced into the system, the flexible layer 802 may deform, creating a fuel plenum 806 or enclosed region (shown in dashed lines in FIG. 8). In an example, the composite layer can be integrated in a flexible electrochemical cell, and the plenums may be arranged so as to minimize space required for the plenums, as is discussed in commonly-owned U.S. Provisional Patent Application Ser. No. 12/238,241 referred to above. In such an example, one or more fuel cells are substantially integrated within a flexible electrochemical layer. The flexible electrochemical layer may optionally include one or more rigid components, and thus, may not be flexible in its entirety.

The system may include a space-saving fluid plenum transformable from a substantially volumeless enclosed region and in this way, allows for the creation of smaller, more compact electrochemical cell systems configurable to fit within an existing electronic device. The enclosed region is located between a fluid control system 812, including one or both of a fluid manifold or a fluid pressure regulator device(s), and at least one fuel cell. In an example, the enclosed region is formed by a peripheral-type of coupling between an outlet side of the fluid control system 812 and the at least one fuel cell via a bond member 810. In varying examples, the enclosed region transforms into a fluid plenum 816 when a fluid exiting the control system 812 pressurizes the enclosed region causing one or more portions of the at least one electrochemical cell to deform away from a position adjacent the outlet side of the fluid control system 812. The space-saving fluid plenum can be used in conjunction with other fuel cell components, such as a fluid reservoir, a fluid pressure regulator device(s), a fluid manifold, an electrochemical cell layer having an internal support structure, to create a compact fuel cell system.

At least one fuel cell in the flexible layer may be coupled with portions of a fluid manifold via a bond member 810, and in this way, creates one or more enclosed regions therebetween. The bond member 810 may include any physical or chemical means, such as an adhesive member, a weld member, a solder member, a braze member, or mechanical fasteners or protrusions. In an example, the enclosed region has a thickness that is approximately equal to a cross-sectional thickness of the bond member, such as about 0.05 mm or less. In another example, the fluid manifold and the at least one fuel cell have a combined cross-sectional thickness of about 5 mm or less, about 2 mm or less, or about 0.6 mm or less.

The fluid manifold includes at least one material directing recess 814 extending therethrough. Each material directing recess 814 receives, at an input, fuel flow from a fluid reservoir and provides, at an output, the fuel flow to the enclosed region 816. In an example, the fuel flow includes at least one of hydrogen, methanol, formic acid, butane, borohydride compounds (including sodium and potassium borohydride), or liquid organic hydrogen carriers. The continuing receipt of fuel flow to the enclosed region 816 causes portions of the at least one fuel cell to deform away from a position adjacent the fluid manifold, thereby forming a fluid plenum 806. In operation, the fluid reservoir may be filled with fuel by pressurizing a charge port. A fluid pressure regulator assembly, including an array of fluid pressure regulator devices, may be used to reduce or maintain a pressure in the fluid plenum 806 to a level sufficient for the operation and movement of the at least one fuel cell, such as to the position shown in phantom. In an example, a distance between the fluid manifold and the at least one fuel cell is about 5 mm or less at the pressurized plenum state.

A first side of a fluid manifold may be coupled to a first side of an electrochemical cell layer and a second side of the manifold coupled to a first side of different electrochemical cell layer, for example. The manifold or fluidic control system may be coupled to an array in parallel or in series, for example. The manifold may provide a fuel plenum that contacts multiple arrays or multiple unit cells, connected in parallel or in series, for example.

A method of using an electrochemical cell array is disclosed, according to some embodiments. A first reactant may be provided to a fluidic plenum coupled to a first side of an electrochemical cell array having at least one cell interconnect. An electric current may be generated from at least the first reactant. The electrical current may be collected from the first side of the composite layer.

Providing a first reactant may include increasing pressure of the fluidic plenum. Providing may include supplying a first reactant from a fluidic manifold coupled to the first side of the electrochemical cell array. Providing may also include at least portions of the first side of the electrochemical cell array moving away from the fluidic manifold.

The first side of the composite layer may be an anode side. A second side of the composite layer may be a cathode side, for example. The first reactant may be hydrogen. The second side of the composite layer may be contacted with a second reactant, such as an oxidant. The second reactant may be contacted passively or actively. Generating may include consuming the first reactant, thereby reducing the pressure of the fluidic plenum.

Collecting may include collecting the current from a plurality of electrochemical cells in a series electrical configuration, a parallel configuration, or a combination thereof. Collecting may also include collecting the current from terminal current collectors or at least one interconnect between adjacent cells in the array.

The composite layers described herein may be manufactured using any number of processes. For example, the composite layers may be formed in a manner conducive to mass-manufacturing, such as roll-to-roll manufacturing. Referring to FIGS. 9A-D, in some embodiments, the composite layers may be formed by forming at least two electrically conductive components 910, 911, which may serve as cell interconnects (see FIG. 9A). The electrically conductive components 910, 911 may be formed by laminating multiple components together, for example. The electrically conductive component 910, 911 may include one or more forms of carbon, for example, and may further include non-electrically conductive components, such as an epoxy, for example.

An interface region 918 may then be adhered to at least one surface of each electrically conductive components 910, 911 (see FIG. 9B). The interface region 918 may be a discrete component which is attached to the conductive component, or may be a material which is applied to a surface of the conductive component. For example, the interface region 918 may be a thermoset polymer which may be applied to a surface of the conductive components 910, 911 in a liquid form, and then cured to form a composite solid component including both the conductive component and the interface region. The thickness of the interface region may be adjusted depending on the tolerances of the manufacturing process; for example, the interface region may have a thickness sufficient to ensure that an electrical discontinuity can be formed between adjacent cells, including tolerances required for the manufacturing process. The thickness of the interface region may be as small as about 15 micrometers, for example. Or, the thickness of the interface region may be about 100 micrometers or about 200 micrometers or greater. The thickness of the interface region may be chosen so as to enable a tool or a machine of a given radius to form an electrical discontinuity between coatings of adjacent electrochemical cells. Further, the interface region 918 may be utilized to promote or enhance bonding between the dielectric components 912 and the electrically conductive components 910, 911. Such bonding may be achieved via a combination of mechanical, physical, and chemical bonding mechanisms.

At least one dielectric component 912 may then be formed by casting an ionomer dispersion in proximity to and in contact with the interface region(s) 918, and curing the ionomer dispersion sufficient to form a fluidically impermeable layer (see FIG. 9C). The ionomer dispersion may be cured using heat, pressure, or a combination thereof. The ionomer dispersion may be a PFSA copolymer, for example.

Coatings 902, 904, 906, 908 may then be disposed on the surfaces of the layer (see FIG. 9D). The coatings may be catalyst layers, for example. In the embodiment shown, coating 906 is disposed such that it is in contact with dielectric component 912, and in electrical contact with conductive component 911, but electrically isolated from conductive component 910, thereby electrically isolating adjacent electrochemical cells. Similarly, coating 904 is in contact with dielectric component 912, and in electrical contact with conductive component 910, but electrically isolated from conductive component 911.

Although not fully shown in FIG. 9, coating 902 may be in electrical contact with conductive component 910, and further in contact with an adjacent dielectric component (not shown), and further electrically isolated from a third conductive component (not shown). Similarly, coating 908 may be in electrical contact with conductive component 911, in contact with a different adjacent dielectric component (not shown), and further electrically isolated from a fourth conductive component (not shown).

The width, d, 920 of the insular break between coatings 902, 906, provides the electrical isolation between adjacent cells. In the embodiment shown, the thickness of the interface region is greater than the width, d, 920, plus whatever tolerance is needed by the manufacturing process used to dispose the coatings 902, 904, 906, 908 to ensure that electrical isolation is always maintained The above description is intended to be illustrative, and not restrictive. For example, the above-described examples (or one or more features thereof) may be used in combination with each other. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. In addition, while the majority of this patent document discusses fuel or reactant based fluid applications, the present systems and methods can be used for other fluid transfer applications in ways similar to those discussed herein. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:
1. An electrochemical cell array, comprising:
   a composite layer having a first side and a second side, the composite layer including two or more electrically conductive components, each electrically conductive component having one or more electrically conductive passageways, wherein the conductive components are formed from a composite material; and one or more dielectric components, each dielectric component having one or more ion-conducting passageways;

one or more interface regions;

wherein the electrically conductive components and the dielectric components are adjacently arranged; and wherein the interface regions are disposed between adjacent dielectric components and conductive components; and wherein the interface regions are made of electrically non-conductive and ionically non-conductive material that bonds to both the dielectric components and the conductive components and wherein the one or more interface regions each extend through the composite layer from the first side of the composite layer to the second side of the composite layer; and the electrically conductive components, the dielectric components, and the interface regions collectively define a flat first surface and a flat second surface;

one or more first coatings in contact with the first side of the composite layer;

one or more second coatings in contact with the second side of the composite layer;

wherein each first coating is in contact with at least one of the ion-conducting passageways of a first dielectric component and in electrical contact with at least one of the electrically conductive passageways of a first electrically conductive component;

wherein each second coating is in contact with at least one of the ion-conducting passageways of a second dielectric component and in electrical contact with the at least one electrically conductive passageway of the first electrically conductive component, sufficient to provide an electrically conductive pathway extending through the composite layer from the first side of the composite layer to the second side of composite layer between adjacent electrochemical cells in the array; and wherein each of the one or more first coatings and each of the one or more second coatings include an edge that extends over a width of one of the interface regions; and a width of the interface region is sufficient to enable an electrical discontinuity to be formed between coatings of adjacent electrochemical cells.

2. The electrochemical cell array of claim 1, wherein one or both of the first coating and the second coating includes a catalytically active material.

3. The electrochemical cell array of claim 1, wherein the electrochemical cells comprise fuel cells.

4. An electrochemical system, comprising:
the electrochemical cell array of claim 1; and
one or more fluidic plenums;
wherein the one or more fluidic plenums are at least partially defined by the electrochemical cell array.

5. The electrochemical system of claim 4, wherein the fluidic plenums comprise at least one fuel plenum, at least one oxidant plenum or combinations thereof.

6. The electrochemical system of claim 4, further comprising a fluidic manifold, coupled to the composite layer.

7. The electrochemical system of claim 6, wherein at least one of the fluidic plenums is defined by the composite layer, the fluidic manifold, and at least one electrically conductive component.

8. The electrochemical system of claim 1, wherein the at least one electrically conductive component comprises a composite including carbon and epoxy.

9. The electrochemical system of claim 1, wherein the interface region comprises a thermoset polymer.

10. The electrochemical system of claim 1, wherein the dielectric components include a perfluorosulfonic acid copolymer.

11. The electrochemical cell array of claim 1, wherein the composite layer is flexible.

12. The electrochemical cell array of claim 1, wherein each of the electrically conductive components comprise a first material and each of the dielectric components comprises a second material and wherein the first and second materials interact.

13. The electrochemical cell array of claim 12, wherein the first and second materials chemically interact.

14. The electrochemical cell array of claim 12, wherein the electrically conductive and ion-conducting components physically interact.

15. The electrochemical cell array of claim 1, wherein the electrically conductive components comprise a metal, a metal foam, a carbonaceous material, a graphite composite, a conductive epoxy, a conductive polymer, a conductive ceramic, carbon fiber, woven carbon cloth, a pultruded composite, expanded graphite, graphite, vitreous carbon, carbon, epoxy, graphite filled epoxies, graphite filled polymers, or combinations thereof.

16. The electrochemical cell array of claim 1, wherein the electrically conductive passageways extend from a first surface of the composite layer to a second surface of the composite layer.

17. The electrochemical cell array of claim 1, wherein a width of the interface region is greater than or equal to about 15 micrometers.

18. The electrochemical cell array of claim 1, wherein a width of the interface region is greater than or equal to about 200 micrometers.

19. The electrochemical cell array of claim 1, wherein the electrically conductive components and the dielectric components are arranged in substantially parallel strips.

20. The electrochemical cell array of claim 1, wherein the dielectric components and conductive components are less than or equal to 2 millimeters in width.

21. The electrochemical cell array of claim 1, wherein the composite layer is substantially fluidically impermeable at a pressure differential of at or below 15 psi.

22. The electrochemical cell array of claim 1, wherein the composite material includes an additive material that increases a tensile strength, durability, or toughness of the electrically conductive components or alters one or more properties of the electrically conductive components.

23. The electrochemical cell array of claim 22, wherein the additive material includes carbon fibers.

24. The electrochemical cell array of claim 23, wherein the carbon fibers extend parallel to a surface of the composite material of the conductive components.

25. The electrochemical cell array of claim 23, wherein the carbon fibers extend from the first side to the second side.

26. The electrochemical cell array of claim 1, wherein the composite material includes woven carbon cloth impregnated with an epoxy.

27. The electrochemical cell array of claim 1, wherein one of the interface regions are in physical contact with one of the first coatings and with one of the second coatings.

28. The electrochemical cell array of claim 1, wherein the electrically conductive components, dielectric components, and the interface regions collectively define the first side and the second side and wherein the first side is a flat surface opposite the second side.

29. The electrochemical cell array of claim 28, wherein the second side is a flat surface.

30. The electrochemical cell array of claim 1 wherein each of the electrically conductive components, the dielectric components and the interface regions are arranged as substantially parallel columns which extend from the first side of the composite layer to the second side of the composite layer.

31. A method of forming the electrochemical cell array of claim 1, comprising:
   forming at least two of the electrically conductive components;
   adhering at least one of the interface regions to a surface of each of the electrically conductive component;
   forming at least one of the dielectric components by casting an ionomer dispersion in proximity to a corresponding interface region and in contact with the interface region;
   curing the ionomer dispersion sufficient to form the fluidically impermeable composite layer; and,
   disposing at least one of the first coatings on the first side of the composite layer and at least one of the second coatings on the second side of the composite layer,
   wherein the first coating is in contact with one dielectric component, a first adjacent electrically conductive component, and an interface region and the second coating is in contact with one dielectric component, a first adjacent electrically conductive components, and an interface region.

32. The method of claim 31, wherein a width of the interface region is sufficient to provide an electrical discontinuity between coatings of adjacent electrochemical cells.

33. The method of claim 31, wherein the first coating is electrically isolated from a second adjacent electrically conductive component.

* * * * *